(12) United States Patent
King

(10) Patent No.: US 9,358,776 B2
(45) Date of Patent: Jun. 7, 2016

(54) METHOD FOR USING A FOIL ON A PRINTING PRESS AND OPTIMIZING THE MAXIMUM USAGE OF THE FOIL

(71) Applicant: Graphic Art System, Inc., Ocean, NJ (US)

(72) Inventor: Michael King, Ocean, NJ (US)

(*) Notice: Subject to any disclaimer, the term of this patent is extended or adjusted under 35 U.S.C. 154(b) by 134 days.

(21) Appl. No.: 14/463,724

(22) Filed: Aug. 20, 2014

(65) Prior Publication Data

US 2015/0053338 A1  Feb. 26, 2015

Related U.S. Application Data

(60) Provisional application No. 61/867,737, filed on Aug. 20, 2013.

(51) Int. Cl.

| | |
|---|---|
| B44C 1/16 | (2006.01) |
| B41F 16/00 | (2006.01) |
| B44C 1/165 | (2006.01) |
| B32B 37/12 | (2006.01) |
| B32B 37/26 | (2006.01) |
| B32B 38/14 | (2006.01) |
| B41F 19/06 | (2006.01) |
| B32B 38/10 | (2006.01) |
| B32B 37/10 | (2006.01) |
| B44C 1/10 | (2006.01) |
| B41F 19/00 | (2006.01) |
| B32B 38/00 | (2006.01) |

(52) U.S. Cl.
CPC .............. *B41F 19/062* (2013.01); *B41F 16/006* (2013.01); *B32B 37/1284* (2013.01); *B32B 38/145* (2013.01); *B41F 19/001* (2013.01); *B41F 19/005* (2013.01); *B44C 1/105* (2013.01); *B44C 1/165* (2013.01); *Y10T 156/1174* (2015.01)

(58) Field of Classification Search
CPC . B32B 37/1284; B32B 38/145; B41F 19/062; B41F 16/0006; B41F 19/005; B41F 19/001; B41P 2219/51; B41P 2219/20; B41P 2219/22; Y10T 156/1174; B44C 1/105; B44C 1/165; G09F 3/10
USPC .............. 156/184, 231, 241; 101/23; 400/248
See application file for complete search history.

(56) References Cited

U.S. PATENT DOCUMENTS

| 6,125,751 A | 10/2000 | Korem | |
|---|---|---|---|
| 2008/0295710 A1* | 12/2008 | Ohsawa | B41F 7/06 101/23 |
| 2012/0193024 A1 | 8/2012 | DeBard et al. | |
| 2013/0075040 A1 | 3/2013 | Grinberg et al. | |

FOREIGN PATENT DOCUMENTS

GB  1303185  1/1973

* cited by examiner

*Primary Examiner* — Sonya Mazumdar
(74) *Attorney, Agent, or Firm* — Gearhart Law, LLC

(57) ABSTRACT

A method for material deposition employs a printing press, such as those used in cold foil transfers, that permits a greater usage of the foil web than traditional methods. This is achieved by increasing the number of times the foil web is passed through the press, while simultaneously taking into account the area that has not been used and adjusting the impacted area of the foil web accordingly. The foil web is adjusted by using a series of adjustable rollers and angular bars to change the length of the circumferential path the foil takes through the press. By modifying the angle of these rollers and the distance between them, the path can be lengthened or shortened to correspond to the particular needs for a particular print job. This allows the press to use the foil in such a way that reduces foil waste and manufacturer and consumer costs.

14 Claims, 6 Drawing Sheets

METHOD FOR USING A FOIL ON A PRINTING PRESS AND OPTIMIZING THE MAXIMUM USAGE OF THE FOIL

CLAIM OF PRIORITY

This application claims priority to U.S. Application Ser. No. 61/867,737 filed on Aug. 20, 2013, the contents of which are herein fully incorporated by reference in its entirety.

FIELD OF THE EMBODIMENTS

The field of invention and its embodiments relates to printing presses, namely foil printing presses employing a cold foil methodology. In particular, using a specific methodology to reduce foil waste, thus implementing substantive cost saving measures to the manufacturer and consumer alike.

BACKGROUND OF THE EMBODIMENTS

Historically, foil has been used for centuries as a means of adornment and decoration. A malleable metal, such as gold, was typically pounded into very thin sheets (i.e. foil) and then applied to armor, letters, and various types of furniture or artwork. What used to be reserved for the rich now has become a staple of the masses thanks to substantive improvements in technology.

Foil is still expensive; however, it is now more common to find various types of foil with a base of aluminum in present mechanical processes. These foil works are ubiquitous and most often seen in commercial packaging, books, wedding announcements, cards, and the like. Notwithstanding the progression of foiling technology, the current foiling processes are not without their drawbacks. Most often, vast amounts of foil are wasted in the printing or stamping process. This is due to the high speed at which the presses run, which is typically referred to as "press speed." This continuous foiling process is fast and simple, but as mentioned results in a substantial waste of foil and thus a waste of money.

Even still, the cold foiling process has remained fairly unchanged for some time. Typically, a substrate is fed through a pair of rollers which apply an adhesive to the substrate. A separate foil web is then merged with the adhesive laden substrate and the two are pressed together through another set of rollers. The adhesive then cures on its own, or is cured by another means such as ultraviolet light. The excess foil is then stripped away from the substrate and the substrate continues down a conveyor for further treatment or packaging. The excess foil is collected by a collection core. Once the foil has run its course through the press, it cannot be reused.

Thus, there is a need for a more efficient process in order to reduce said foil waste and manufacturing costs. The current invention meets and exceeds these needs and objectives.
Review of Related Technology:

U.S. Patent Application 2013/0075040 pertains to systems, machines and products for producing foil relief. The system includes apparatuses for placing a foil on a curable adhesive deposited on a substrate when the curable adhesive is substantially non-tacky, and applying energy to the adhesive deposited on the substrate while pressing the foil to the adhesive to cause the adhesive to become tacky and to adhere to the foil. The adhesive becomes substantially fully cured prior to completion of the pressing of the foil to the adhesive deposited on the substrate. In some embodiments, the system may further include one or more energy sources for pre-curing the curable adhesive prior to placing the foil on the adhesive to initiate the curing process of the adhesive and manipulate a viscosity level of the adhesive, with the pre-cured adhesive remaining substantially non-tacky. The curable adhesive includes one or more of, for example, a radical type adhesive and/or a cationic adhesive.

U.S. Patent Application 2012/0193024 pertains to a material deposition technique for transferring material to a substrate. The material may be a foil on a carrier and the substrate may be printable paper. A computer-controlled, material application subsystem is provided having a material roller assembly including one or more material pressing rollers. The entire assembly is configured for controlled rotation such that the material pressing rollers alternately engage and disengage an impression cylinder. In a first rotatable position, the material roller assembly is rotated so that one of the material deposition rollers over which the material carrier is fed engages the impression cylinder and deposits the material onto the substrate as it passes beneath the roller. In a second rotatable position, the material roller assembly is rotated so as to disengage the material roller from the impression cylinder thereby precluding deposition of material onto the substrate as it passes beneath the roller.

Various devices are known in the art. However, their structure and means of operation are substantially different from the present disclosure. The other inventions fail to solve all the problems taught by the present disclosure. The present invention and its embodiments enable a foil web to be used repeatedly on a single pass through a press. The foil web is positioned to minimize waste while not comprising the speed and effectiveness of the press. At least one embodiment of this invention is presented in the drawings below and will be described in more detail herein.

SUMMARY OF THE PREFERRED EMBODIMENTS

The current invention and its embodiments disclose a material deposition method having the steps of unwinding a foil web from an unwind core; feeding the foil web through a press, wherein the press has a sync cartridge having a plurality of roller trays, the plurality of roller trays having at least two angular guide assemblies and being operably connected to a plurality of motors wherein, the plurality of motors provide differing angles to the at least two angular guide assemblies to manipulate the circumference of the foil web in relation to adherence to the substrate; using the sync cartridge to create at least two connected, substantially circular foil raceways for the foil web; applying a layer of adhesive to the substrate; bringing at least two sections of the foil web into contact with the substrate more than once; and separating the foil web from the layer of adhesive for a final time, wherein the foil web is collected upon a rewind core and the substrate continues through the press.

The material deposition method uses a continuous foil web in the foiling process. The process itself is also continual, unlike other start/stop methodologies. This is done by looping the foil at least twice, and as many as 6 times or more, through the press and cold foiling attachment. The number of loops, typically referred to as "raceways," is determined by the width of the foil web layout in relation to the maximum allowed width of the machine. The press can change the angle of the angular guide assemblies thereby changing the circumference of the foil web. If one desires to increase the circumference of the foil raceways, then the angle of the angular guide assemblies and distance between them is increased, and to decrease the circumference of the foil web the angle of the angular guide assemblies and the distance between them is decreased. The method may further comprise repeating the aforementioned steps using a second foil web. In this instance, the above described methodology can be combined with multiple foils of varying widths and types of foils to accommodate the various foiled areas needed for a particular project.

In another embodiment, a material deposition method is described having the steps of unwinding a foil web from an unwind core; feeding the foil web through a press wherein the press has a sync cartridge wherein, the sync cartridge has a plurality of roller trays, the roller trays having at least two angular guide assemblies, the at least two angular guide assemblies having the capability to be manually manipulated to a particular angle and distance in order to change the circumference of the foil web in relation to the adherence to the substrate; using the sync cartridge to create at least two connected, substantially circular foil raceways for the foil web; applying a layer of adhesive to the substrate; bringing at least two sections of the foil web into contact with the substrate more than once; and separating the foil web from the layer of adhesive for a final time, wherein the foil web is collected upon a rewind core and the substrate continues through the press. This embodiment comprises generally the same principles as the previous embodiment described above; however, here one must manually change the angles and distances of the angular guide assemblies to achieve the varying circumferences for the foil web.

In general, the present invention succeeds in conferring the following, and others not mentioned, benefits and objectives:

It is an object of the present invention to provide a material deposition method for reducing waste in cold foil printing.

It is an object of the present invention to provide a material deposition method that enables multiple foil webs of varying widths to be run through a press simultaneously.

It is an object of the present invention to provide a material deposition method that provides a cost effective solution for reducing waste and its associated costs.

It is an object of the present invention to provide a material deposition method that reduces manufacturer and consumer cost.

It is an object of the present invention to provide a material deposition method that enables one to manually manipulate the length of the foil raceway.

It is another object of the present invention to provide a material deposition method that enables one to automatically change the length of the foil raceway.

It is another object of the present invention to provide a material deposition method for a cold foil press that permits multiple, continuous raceways for a foil web.

DETAILED DESCRIPTION OF THE PREFERRED EMBODIMENTS

Figure 1:
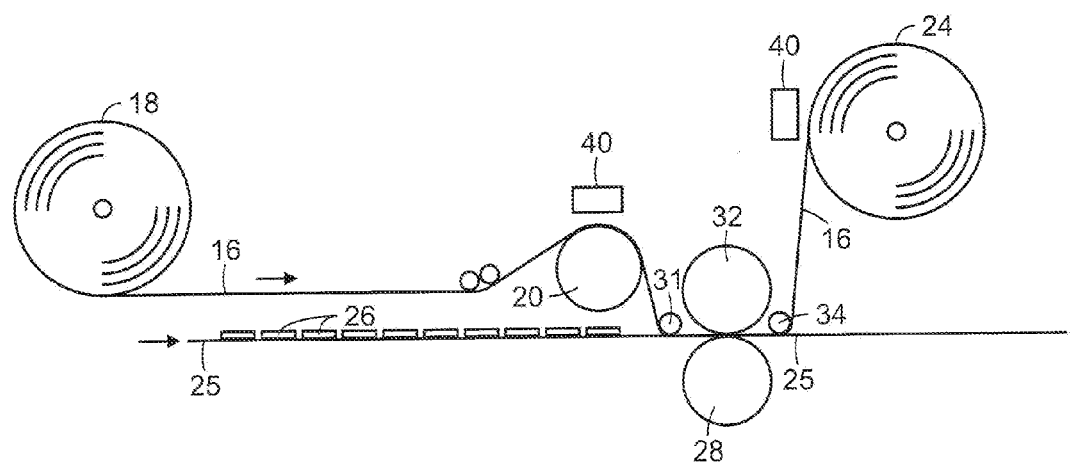
FIG. 1 is a diagram demonstrating a prior art method of depositing a material using a cold foil press.

The preferred embodiments of the present invention will now be described with reference to the drawings. Identical elements in the various figures are identified, as far as possible, with the same reference numerals.

Reference will now be made in detail to embodiments of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto without deviating from the innovative concepts of the invention.

As defined herein, "circumference" refers to the distance traveled by the foil web by way of a number of looped passes, or raceways, through the complete press. The overall distance is calculated and can be changed to suit the job at hand based on the number and size of images that must be printed.

In FIG. 1, there is a typical prior art apparatus/method for depositing a material, such as a foil web 16, onto a substrate 25. The foil web 16 is unwound from a foil unwind core 18. It moves along through the press and meets an alignment roller 20. The foil web 16 passes through the alignment roller 20 and alignment nip 31 meeting the substrate 25 laden with an adhesive 26. The foil web 16 and substrate 25 combination pass through a roller assembly 28 and 32.

Here, the foil web 16 is pressed into the adhesive laden substrate 25 fusing the foil web 16 to the adhesive 26. The unadhered foil web 16 and substrate 25 are separated by a separation nip 34 and the leftover foil web 16 goes to a foil rewind core 24. The substrate 25, typically in an individual sheet form, goes to the next transfer cylinder (not shown) and continues through the press to have various transparent colors printed on top of foiled and non foiled areas of the sheet This method creates a large amount of wasted foil web 16, as the operational press speed is such that it allows for small percentages of the foil web 16 to be adhered to the substrate 25. The process is typically driven by a number of servo motors 40. The current method, as described, greatly reduces the waste experienced with the aforementioned prior art methodology.

Figure 2:
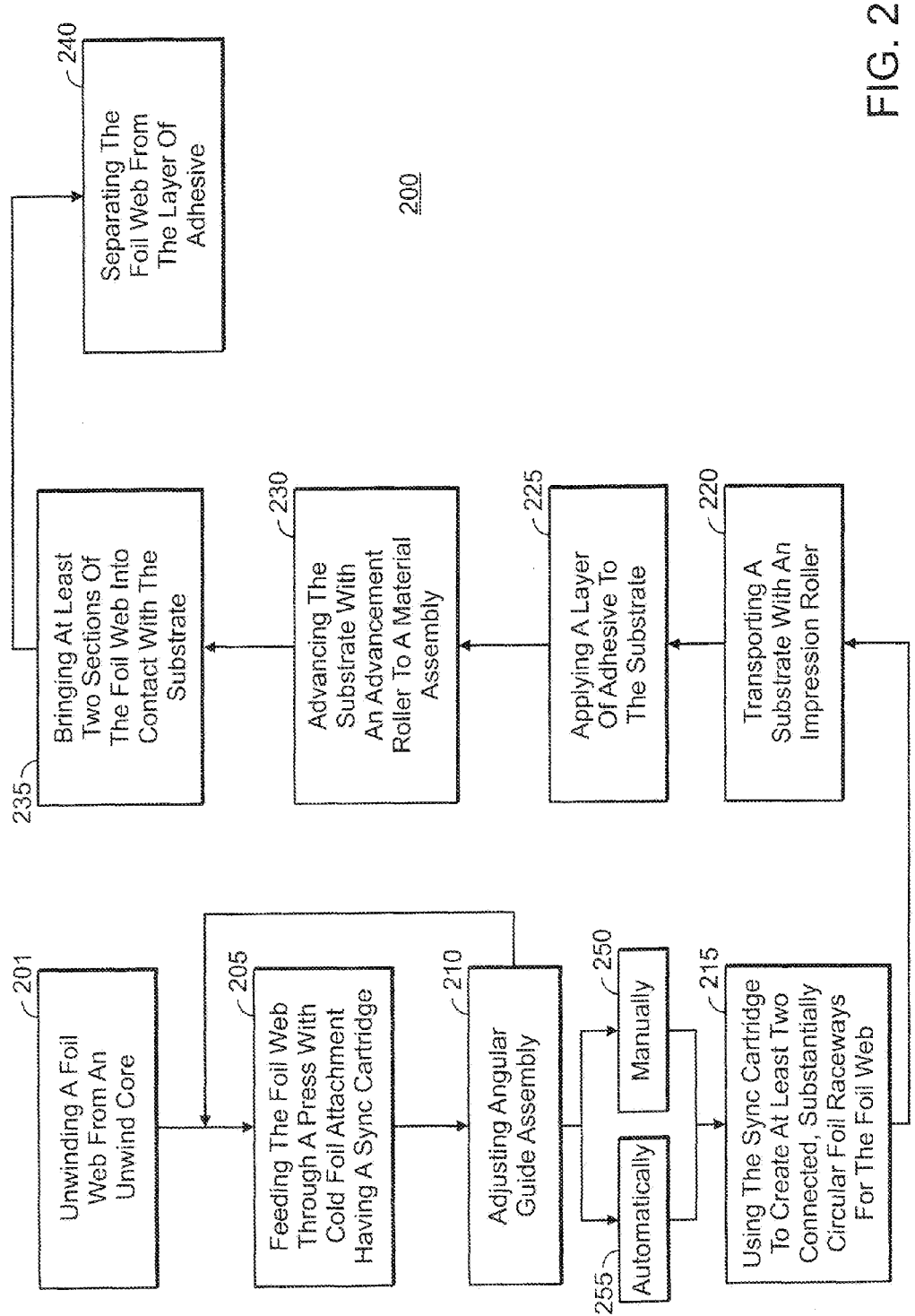
FIG. 2 is a flow chart illustrating a method of depositing a material as described by the present invention and its embodiments.

FIG. 2 generally illustrates the preferred material deposition method 200 as described by the current invention and its embodiments.

In step 201, a foil web is unwound from the foil unwind core. This is a continuous foil web which is used from start to finish for the job.

In step 205, the foil web is fed through the press fitted with a sync cartridge. The sync cartridge permits the foil web to form multiple raceways through the press thereby increasing the amount of foil web used and decreasing the amount of foil web waste. The sync cartridge and its components are further described in FIGS. 3-6.

In step 210, the angle of the angular guide assemblies are set to a particular angle. The exact angle setting of the angular guide assemblies will be dependent on the specifications of the particular print job. Further, the angle settings of the angular guide assemblies can be manipulated independent of one another. In some instances, this step may be performed before the foil web is fed through the press in step 205.

In step 250, the angle adjustments of the angular guide assemblies may be performed manually. Alternatively, the angle adjustments of the angular guide assemblies may be performed automatically by servo motors or the like in step 255.

In step 215, there are at least two continuous raceways that have been created using the press and the sync cartridge. The press used in this methodology is preferably fitted with a cold foil attachment such as the one manufactured by KBA of Germany. Such a press enables one to retrofit a sync cartridge (see FIG. 4) into the existing cold foil attachment.

In step 220, the substrate is then transported with at least one roller to the press.

In step 225, a layer of adhesive is applied to the surface of the substrate. The adhesive used is dependent on the specifications of the job but is nonetheless known in the art.

In step 230, the foil web and the substrate are advanced to a material roller assembly.

In step 235, the two materials are brought together and the foil contacts the adhesive and the two components are pressed together via rollers to ensure a proper adhesion.

In step 240, the remaining unadhered foil is separated from the substrate and rewound on a rewind drum and then disposed.

Figure 3:
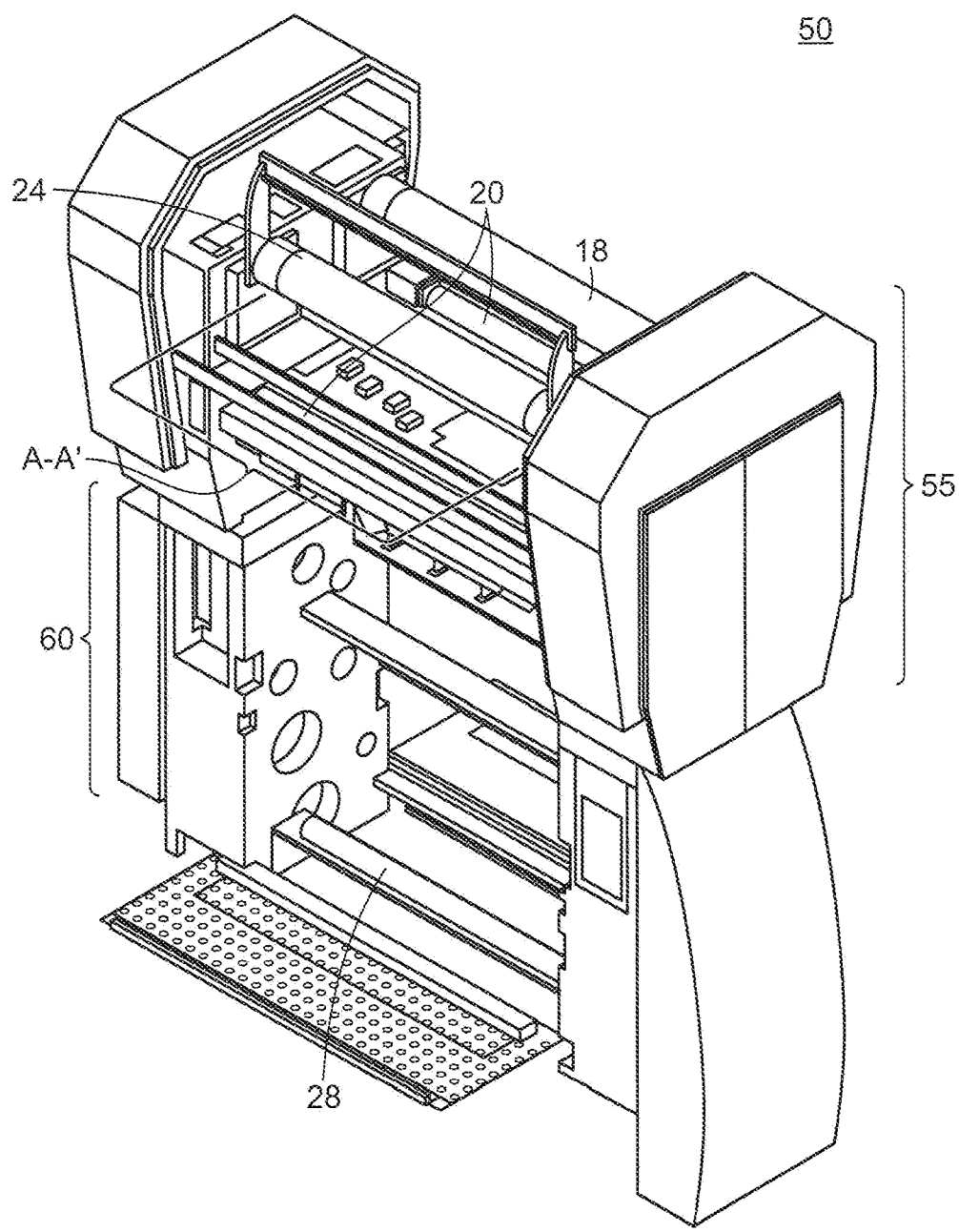
FIG. 3 is perspective back view of an example of a press employing at least the methodology as described in FIG. 2.

Referring now to FIG. 3, there is an example of a complete press 50 comprising of a cold foil attachment 55 and a press unit 60. The press unit 60 can be a number of different styles or brands that are receptive to any type of cold foil attachment 55. The cold foil attachment 55 primarily dictates the alignment of the foil web, while the press unit 60 primarily dictates on the impression and adhesion properties of the process. Area A-A' is the area that is receptive to the sync cartridge further described in FIGS. 4-6.

In making determinations of cost/cost savings and the number of raceways to be run, a number of calculations can be completed. For example, the complete press 50 may accommodate up to about a 1.00 m (40 inch) foil web. Thus, if one desired to run four (4) lanes, or raceways, the maximum foil web width is about 25.4 cm (10 inches).

In general, the cost for a 2.54 cm (1 inch) web is USD$60 for 8000 sheets. Thus, the cost for an about 1.00 m (40 inch) web is USD$2400 for 8000 sheets. By permitting a second raceway, or pass through the complete press 50, the cost for the about 1.00 m (40 inch) foil web is reduced by half or USD$1200. There are multiple iterations where this holds true and the number of passes and widths of the foil web can vary. The one constant in this methodology is the increased foil usage and increased monetary savings.

The complete press 50 typically ranges from about 0.4 m (15 inches) to about 2.3 m (90 inches) and the number of raceways is determined by the amount of space by dividing into the printing press width down to about 5 cm (2 inches) wide of the maximum size. For example, a 0.4 m (15 inch) machine could theoretically have seven (7) raceways that are about 5 cm (2 inches) wide and an about 2.3 m (90 inch) machine could have as much as forty-five (45) raceways if the layouts of the actual foiling job(s) allowed.

Figure 4:
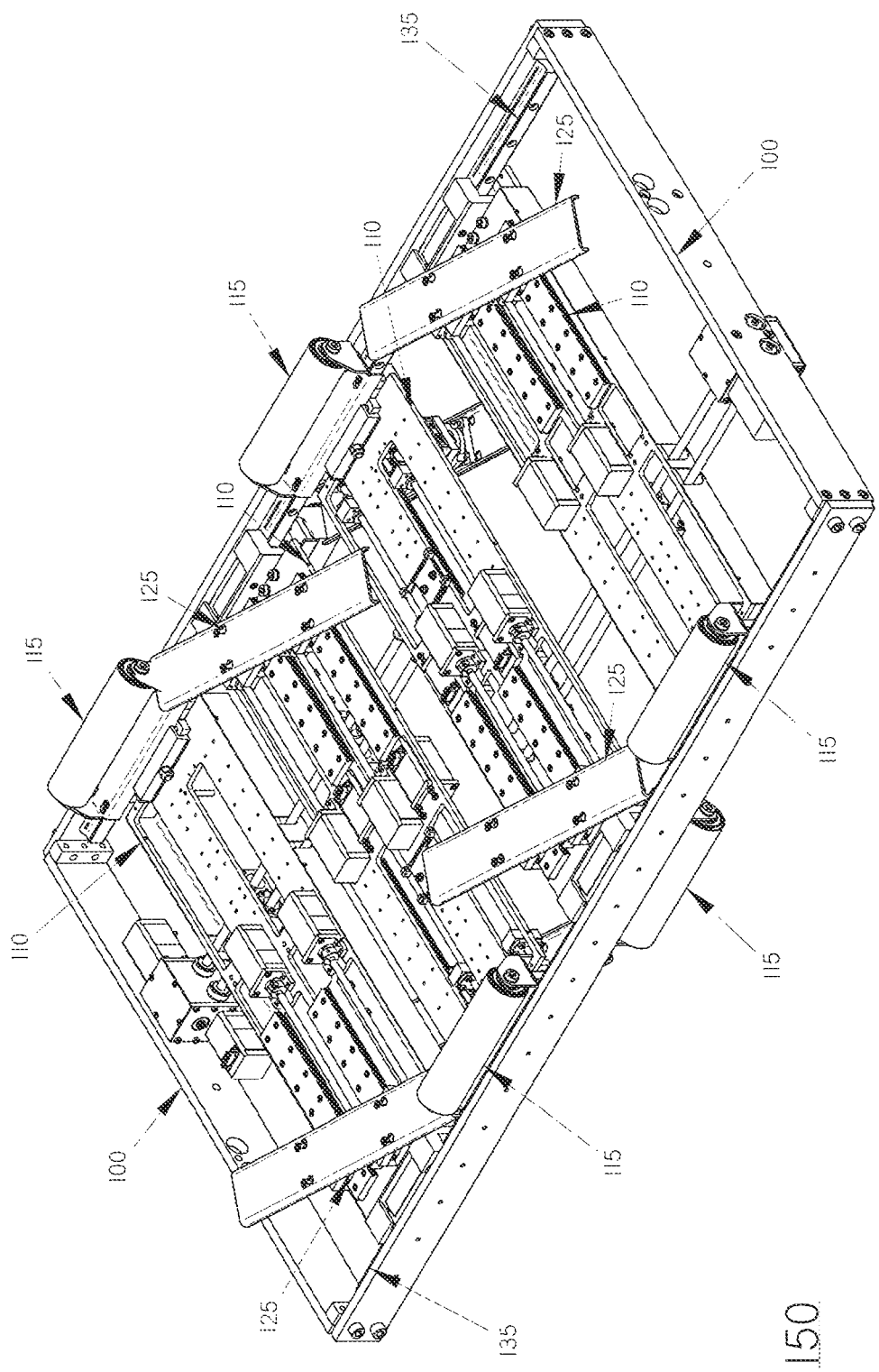
FIG. 4 is a perspective view of a sync cartridge assembly in accordance with the methodology of the present invention.

FIG. 4 is perspective view of a sync cartridge 50 that is received in area A-A' of FIG. 3. The sync cartridge 150 has a frame 100 generally defined by a number, typically four, lateral perimeters. The frame 100 may have a number of locking mechanisms that interact with the press thereby securing the sync cartridge 150 to the press.

There is also a locking track 135 for the roller trays 110. The locking track 135 permits the movement of the roller trays 110. The locking track 135 is positioned to generally run laterally to the width of the frame. The locking tray 135 has a groove which receives the roller trays 110. In some embodiments, the locking tray 135 only permits lateral movement of the roller trays 110. However, in some instances, one can lift a roller tray 110 out of the locking tray 135 thereby allowing one to change the number of roller trays 110 present in the sync cartridge 150.

In order to move a roller tray 110, one must first loosen the fasteners holding the roller trays 110 in place. The roller trays 110 then can be moved and positioned at specific points along the locking track 135. The points at which the roller trays 110 may be secured to the locking track 135 may be fixed (i.e. set points along the track) or the locking tray 135 may enable the roller trays 110 to be positioned at any point along the locking tray 135. Each of the roller trays 110 is further described in FIG. 5 in more detail.

The sync cartridge 150 generally interacts with at least one foil web as described by FIGS. 3 & 4. First, a foil web passes over one of the roller assemblies 115. It passes underneath one of the angular guide assemblies 125 and around over the top of the same angular guide assembly 125. The particular angle of the angular guide assembly 125 dictates the direction the foil web takes thereon. Usually, the foil web will then pass underneath another angular guide assembly 125 and then pass over the top of the same angular guide assembly 125. The foil web will then pass over a roller assembly 115 and travel down into the press unit 60. The general process and orientation of passing the foil web through the angular guide assemblies 125 and roller assemblies 115 is repeated based on the number of raceways being run at a particular time.

Figure 5:
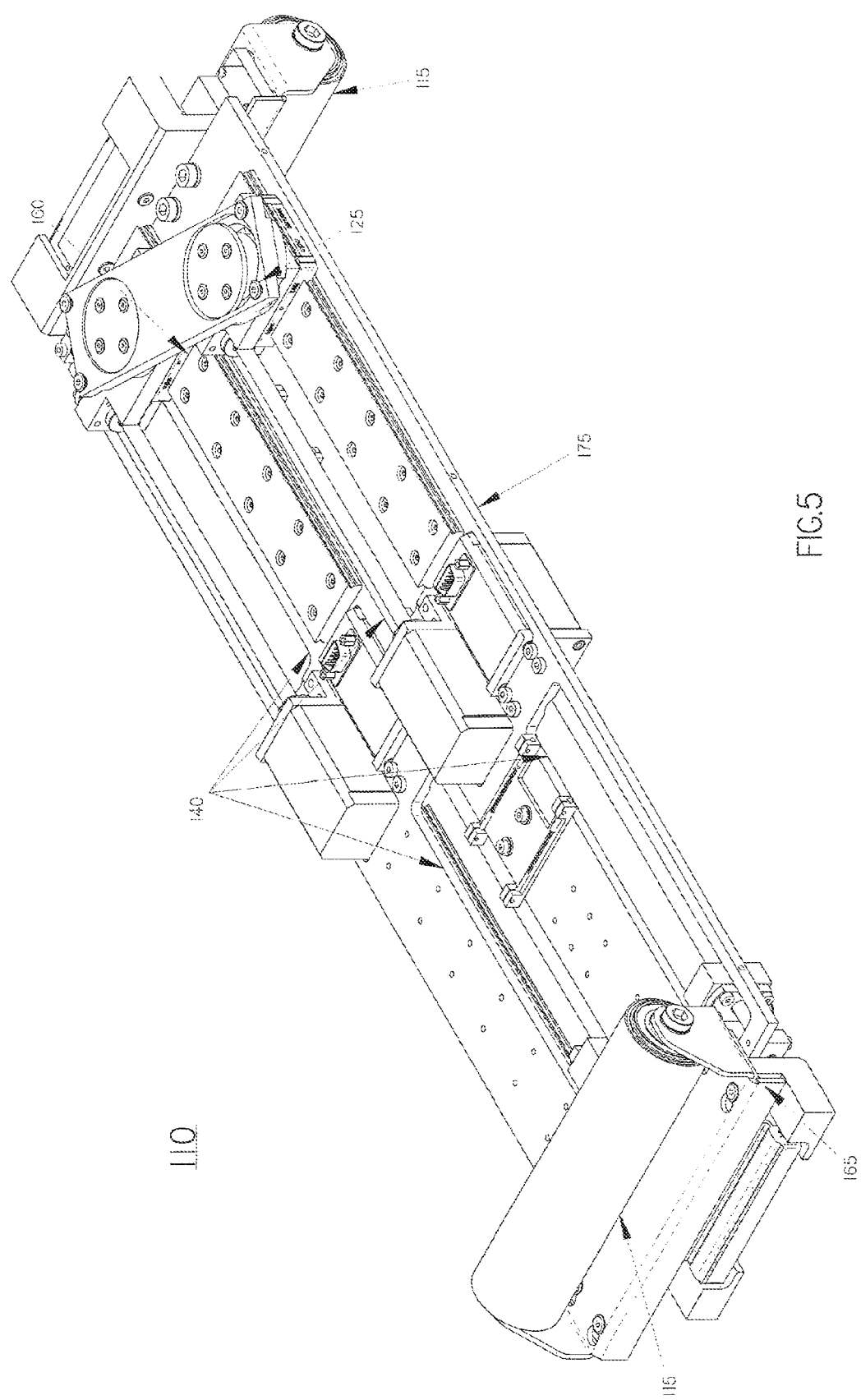
FIG. 5 is a perspective view of a roller tray of a sync cartridge assembly.

FIG. 5 is a perspective view of an example of an individual roller tray 110 from the sync cartridge 150 described in FIG. 4. The roller tray 110 has a base 175 on which the individual components of the tray 110 are disposed. On one end of the base 175 is a roller assembly 115 with a lock block 165. The lock block 165 permits attachment of the roller assembly 115 while still permitting movement of the roller tray 110.

The roller assembly 115 helps with the alignment and tension in the foil web. As shown, there is a roller assembly 115 on the top side of the roller tray 110 and a roller assembly 115 attached to the lower side of the roller tray 110. This provides proper tensioning for the foil web as it travels up and over the roller tray 110 and down the roller tray 110. In some instances, there may be only one roller assembly 115 whereas in other instances the layout may require more than two roller assemblies 115.

The base 175 may also have a slidable track 140. The slidable track 140 permits the angular guide assembly 125 to change angles and distance in relation to the roller assembly 115. The slidable track 140 is a series of channels or grooves in an upper surface of the roller tray 110. Each of the two ends of the angular guide assembly 125 can be adjusted independent the other side via the slidable channel 140. This allows for virtually innumerable angular differences to be created.

The angular guide assembly is held in place by the angle roller pivot lock 160, which further enables the pivoting motion necessary to independently adjust the ends of the angular guide assembly 125. Further, the angle roller pivot lock 160 prevents movement of the angular guide assembly 125 by way of at least one securement mechanism.

Figure 6:
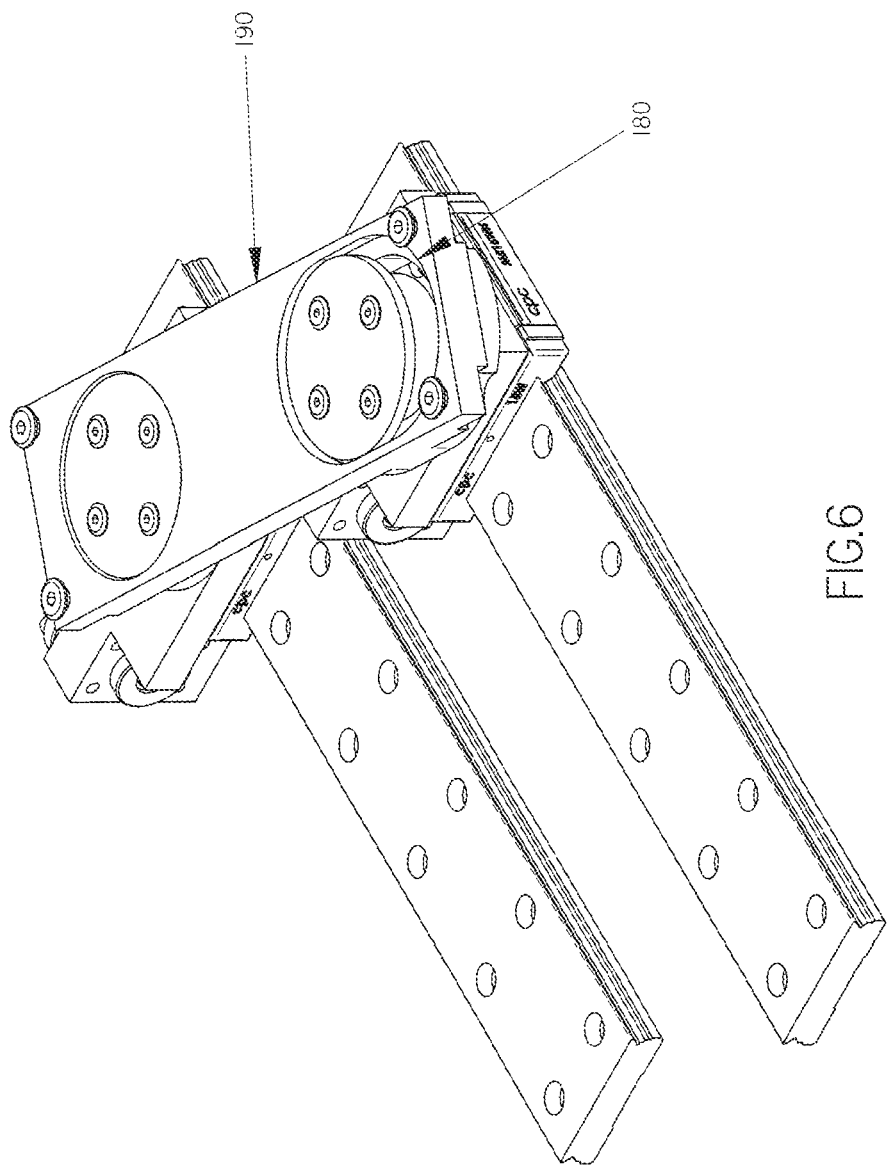
FIG. 6 is a perspective view of an angular guide assembly of a sync cartridge assembly.

FIG. 6 is an example of an angular guide assembly 125 as described above. The angular guide assembly 125 changes angles and positions relative to the sync cartridge 150 in order to change the circumference of the foil web. The circumference of the foil web can be decreased by decreasing the angle and distance between at least two of the angular guide assemblies 125. The circumference of the foil web can be increased by increasing the angle and distance between at least two of the angular guide assemblies 125. A base 190 of the angular guide assembly 125 supports a bar and locking mechanism 180.

As the circumference of the foil web is manipulated by the angular guide assemblies 125, the foil web impacts the substrate at different points on each pass. Thus, the position of the foil web can be such that multiple areas of the foil web can be used in close proximity to one another rather than the wide gaps and wasted foil that is seen with the current cold foiling methodologies.

What is claimed is:

1. A material deposition method comprising:
unwinding a foil web from an unwind core;
feeding the foil web through a press wherein
the press has a cold foiler attachment having a sync cartridge wherein, the sync cartridge has a plurality of roller trays, the plurality of roller trays having at least two angular guide assemblies and being operably connected to a plurality of motors wherein,
the plurality of motors provide differing angles to the at least two angular guide assemblies to manipulate the circumference of the foil web in relation to adherence to a substrate;
using the sync cartridge to create at least two connected, substantially circular foil raceways for the foil web;
applying a layer of adhesive to the substrate;
bringing at least two separate sections of the foil web into contact with the substrate more than once; and
separating the foil web from the layer of adhesive for a final time,
wherein the foil web is collected upon a rewind core, while the substrate continues through the press.

2. The material deposition method of claim 1 wherein the foil web travels continuously from the start to finish of the method.

3. The material deposition method of claim 1 wherein the foil makes multiple passes through the press at more than one alternate position.

4. The material deposition method of claim 1 wherein the number of raceways is determined by the maximum printing width of the press being used divided by a value determined by a format size of the foiled area.

5. The material deposition method of claim 4 wherein the angles of the at least two angular guide assemblies is increased and the distance between the at least two angular guide assemblies is increased in order to increase the circumference of the foil raceway.

6. The material deposition method of claim 4 wherein the angle of the at least two angular guide assemblies is decreased and the distance between the at least two angular guide assemblies is decreased in order to decrease the circumference of the foil raceway.

7. The material deposition method of claim 1 wherein multiple foil webs having the same or different widths can be run through the press simultaneously.

8. A material deposition method comprising:
unwinding a foil web from an unwind core;
feeding the foil web through a press wherein
the press has a cold foiler attachment having a sync cartridge wherein, the sync cartridge has a plurality of roller trays, the roller trays having at least two angular guide assemblies, the at least two angular guide assemblies are capable of being manually manipulated to a particular angle and distance relative to one another in order to change a length of a path traveled by the foil web through the press;
using the sync cartridge to create at least two connected, substantially circular foil raceways for the foil web;
applying a layer of adhesive to the substrate;
bringing at least two separate sections of the foil web into contact with the substrate,
wherein each of the at least two separate sections of the foil web contact the substrate at different positions; and
separating the foil web from the layer of adhesive for a final time,
wherein the foil web is collected upon a rewind core and the substrate continues through the press.

9. The material deposition method of claim 8 wherein the foil web is continuous from start to finish.

10. The material deposition method of claim 8 wherein the number of raceways is determined by the maximum width of the printing press divided by a value determined by a format size of the foiled area.

11. The material deposition method of claim 10 wherein the angle of the at least two angular guide assemblies and the distance between the at least two angular guide assemblies are increased in order to increase the circumference of the at least two connected, substantially circular foil raceways.

12. The material deposition method of claim 10 wherein the angle of the at least two angular guide assemblies and the distance between the at least two angular guide assemblies are decreased in order to decrease the circumference of the at least two connected, substantially circular foil raceways.

13. The material deposition method of claim 8 wherein the foil web makes multiple passes through the press at more than one alternate position.

14. The material deposition method of claim 8 wherein multiple foil webs having the same or different widths can be run through the press simultaneously.

* * * * *